United States Patent
Nakayama

(10) Patent No.: US 10,063,117 B2
(45) Date of Patent: Aug. 28, 2018

(54) DYNAMO-ELECTRIC MACHINE WITH STATOR HAVING TRAPEZOID SHAPE SEGMENTED COIL

(71) Applicant: Hitachi Automotive Systems, Ltd., Hitachinaka-shi, Ibaraki (JP)

(72) Inventor: Kenichi Nakayama, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/064,008

(22) Filed: Mar. 8, 2016

(65) Prior Publication Data

US 2017/0264155 A1    Sep. 14, 2017

(51) Int. Cl.
| | |
|---|---|
| *H02K 3/00* | (2006.01) |
| *H02K 3/12* | (2006.01) |
| *H02K 1/16* | (2006.01) |
| *H02K 3/28* | (2006.01) |
| H02K 3/04 | (2006.01) |

(52) U.S. Cl.
CPC .............. *H02K 3/12* (2013.01); *H02K 1/16* (2013.01); *H02K 3/28* (2013.01); *H02K 3/00* (2013.01); *H02K 3/04* (2013.01)

(58) Field of Classification Search
CPC .. H02K 3/04; H02K 3/12; H02K 3/14; H02K 3/38; H02K 3/52; H02K 3/03; H02K 3/28; H02K 3/00; H02K 3/46; H02K 3/50
USPC ....... 310/179–208; 29/596, 603.23, 605, 606
See application file for complete search history.

(56) References Cited

U.S. PATENT DOCUMENTS

| | | | | | |
|---|---|---|---|---|---|
| 6,181,043 | B1* | 1/2001 | Kusase | .................... | H02K 3/12 310/180 |
| 6,459,177 | B1* | 10/2002 | Nakamura | ............... | H02K 3/12 310/201 |
| 6,501,206 | B2* | 12/2002 | Oohashi | .................... | H02K 3/50 310/180 |
| 7,847,465 | B2* | 12/2010 | Tokizawa | ................. | H02K 3/12 29/596 |
| 8,604,655 | B1* | 12/2013 | Ferran | .................... | H02K 1/278 310/179 |
| 8,659,202 | B2* | 2/2014 | Ikeda | ....................... | H02K 3/12 310/179 |

(Continued)

FOREIGN PATENT DOCUMENTS

JP        2011-151975 A        8/2011

Primary Examiner — Bernard Rojas
Assistant Examiner — Maged Almawri
(74) Attorney, Agent, or Firm — Crowell & Moring LLP

(57) ABSTRACT

There is provided a dynamo-electric machine that can provide excellent insulating properties by downsizing coil ends. A dynamo-electric machine includes a stator and a rotor. The stator has a stator iron core formed with a plurality of slots arranged in a circumferential direction, and a stator coil inserted into the slots of the stator iron core. The rotor is rotatably disposed on the stator iron core with a predetermined gap. The stator coil is provided with an insulating film. The stator coil includes a main coil and a lead wire with an alternating current terminal. The main coil has a plurality of segment coils connected to one another. The segment coil is a conductor in a rectangular cross section formed in advance in a nearly U-shape. The lead wire is led from the slot. The tip end of the segment coil is formed in a trapezoid cross section.

2 Claims, 19 Drawing Sheets

(56) References Cited

U.S. PATENT DOCUMENTS

| | | | | |
|---|---|---|---|---|
| 8,772,995 B2* | 7/2014 | Ogihara | .................... | H02K 3/12 |
| | | | | 310/184 |
| 8,878,413 B2* | 11/2014 | Wolf | ........................ | H02K 3/28 |
| | | | | 310/195 |
| 8,987,969 B2* | 3/2015 | Kamatani | ................ | H02K 3/12 |
| | | | | 310/184 |
| 9,419,484 B2* | 8/2016 | Tokizawa | ................ | H02K 15/04 |
| 9,496,773 B2* | 11/2016 | Ishigami | ............ | H02K 15/0081 |
| 9,647,502 B2* | 5/2017 | Takahashi | ................ | H02K 3/12 |
| 2001/0011852 A1* | 8/2001 | Nakamura | ............... | H02K 3/34 |
| | | | | 310/215 |
| 2002/0033649 A1* | 3/2002 | Oohashi | ................ | H02K 3/28 |
| | | | | 310/184 |
| 2003/0127934 A1* | 7/2003 | Koike | ...................... | H02K 3/12 |
| | | | | 310/201 |
| 2003/0135980 A1* | 7/2003 | Ichikawa | ................ | H02K 3/12 |
| | | | | 29/596 |
| 2010/0270094 A1* | 10/2010 | Nakayama | ............... | H02K 3/12 |
| | | | | 180/65.7 |
| 2011/0181143 A1 | 7/2011 | Hasegawa et al. | | |

* cited by examiner

SIDE VIEW

FRONT VIEW

FIG. 13A  SIDE VIEW
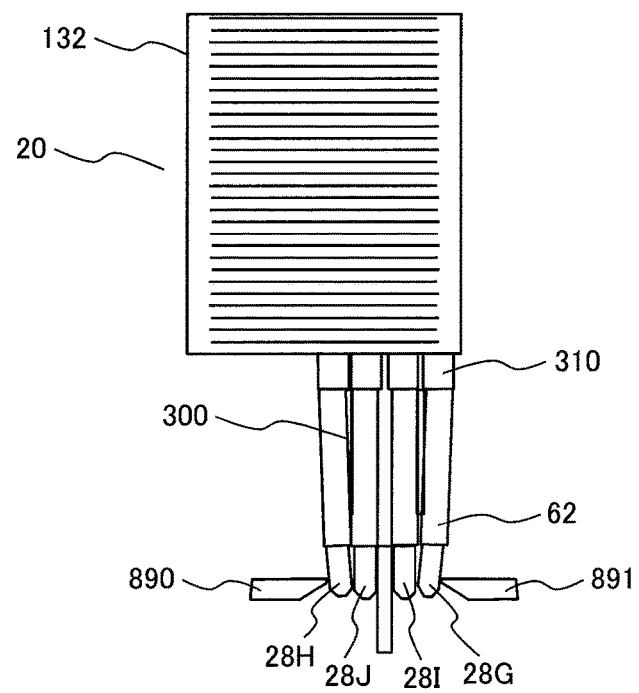
FIG. 13B  FRONT VIEW
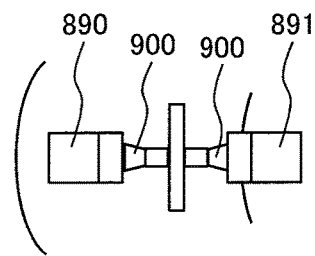

SIDE VIEW

FRONT VIEW

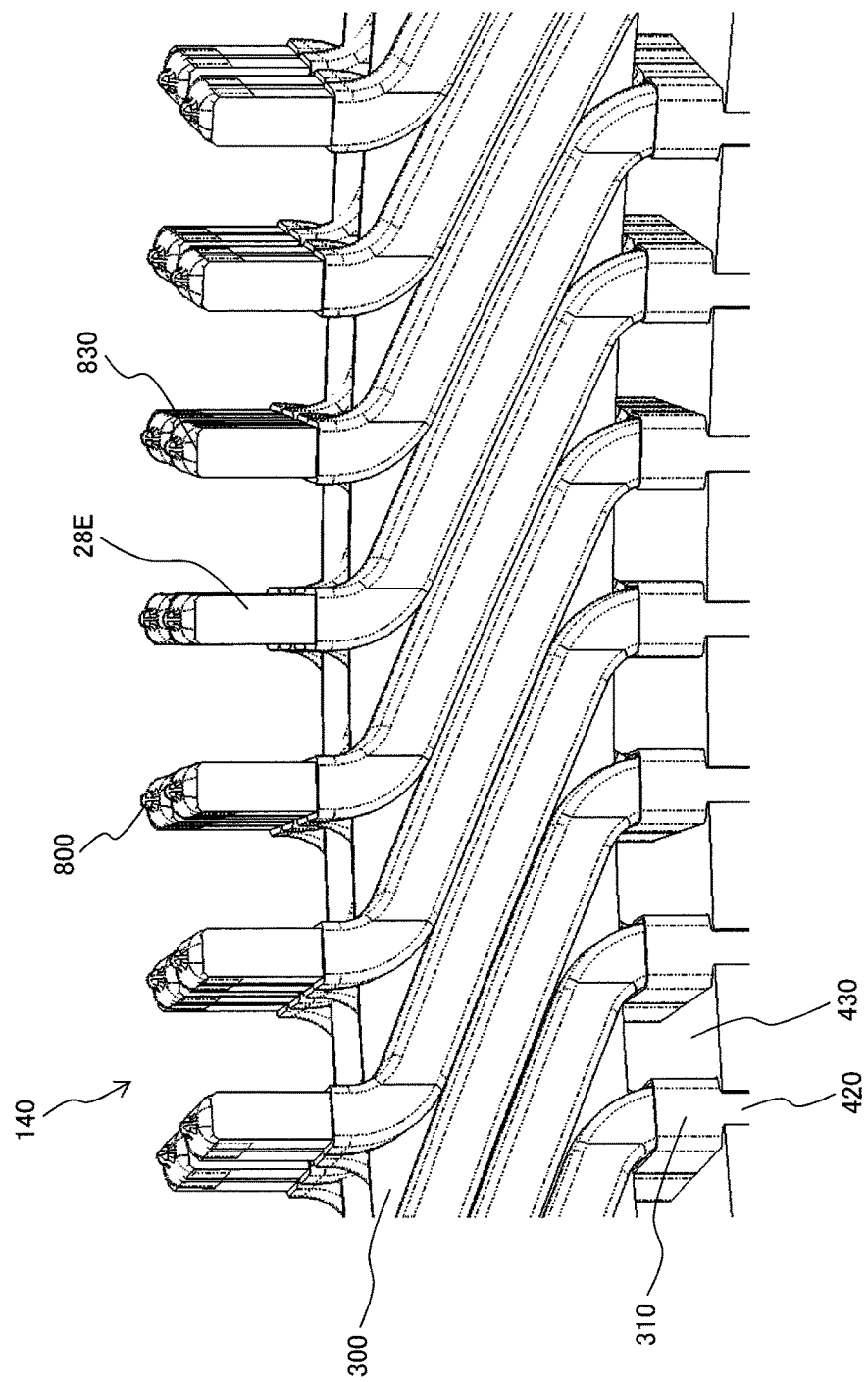

FIG. 18A
FIG. 18B
FIG. 18C
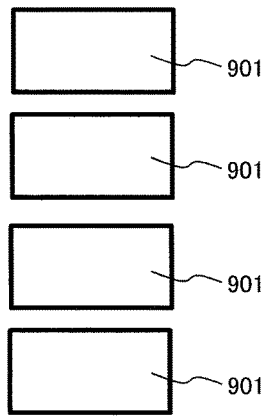
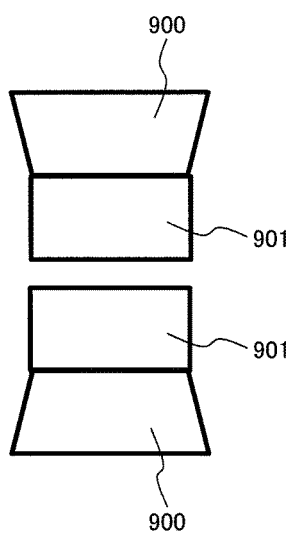
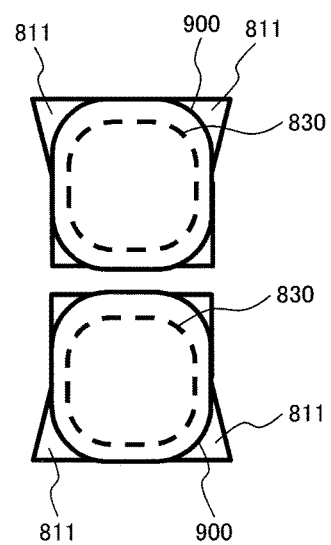

DYNAMO-ELECTRIC MACHINE WITH STATOR HAVING TRAPEZOID SHAPE SEGMENTED COIL

BACKGROUND OF THE INVENTION

The present invention relates to a dynamo-electric machine, and more specifically to a dynamo-electric machine that generates torque to drive an automobile or generates electric power in braking.

In the dynamo-electric machine, alternating-current power is supplied to a stator coil to generate a rotating magnetic field, and then a rotator is rotated with this rotating magnetic field. It is also possible to output alternating-current power from a coil by converting electric energy applied to the rotator into electric energy. As described above, the dynamo-electric machine operates as a motor or a power generator.

For the stator of such a dynamo-electric machine, a configuration is known in which the terminal of a segment coil is welded for connection. For example, see Japanese Patent Application Laid-Open No. 2011-151975.

In the case where this type of dynamo-electric machine is mounted on an automobile, the dynamo-electric machine is installed in a narrow, limited space. This demands the downsizing of the dynamo-electric machine. It is necessary to reduce the size of coil ends in association with downsizing. Therefore, it is necessary to lower the height of coil ends and to provide an insulation distance in a narrow, limited space. A problem is to stably provide an insulation distance.

SUMMARY OF THE INVENTION

A dynamo-electric machine according to an aspect of the present invention is a dynamo-electric machine including a stator and a rotator. The stator has a stator iron core formed with a plurality of slots arranged in a circumferential direction, and a stator coil inserted into the slots of the stator iron core. The stator coil is provided with an insulating film. The rotator is rotatably disposed on the stator iron core with a predetermined gap. In the stator coil, a plurality of segment coils are connected to one another. The segment coil is a conductor in a rectangular cross section formed in advance in a nearly U-shape. In the plurality of segment coils, a coil width of at least one of adjacent segment coils is formed so that the coil width is increased along a direction away from opposed edges of the adjacent segment coils.

According to an aspect of the present invention, the coil end can be downsized, and the insulating properties can be provided.

BRIEF DESCRIPTION OF THE DRAWINGS

FIG. 13A is a diagram of segment coils deformed by cutting tools;

FIG. 13B is a diagram of segment coils deformed by the cutting tools;

FIG. 16 is a perspective view of a coil end of a stator coil of the dynamo-electric machine according to the embodiment of the present invention after phase coils are joined to one another;

FIG. 18A is a schematic diagram of segment coils according to another embodiment illustrating the shape of segment coils before they are formed in a trapezoid cross section;

FIG. 18B is a schematic diagram of segment coils according to another embodiment illustrating the shape of segment coils formed in a trapezoid cross section;

FIG. 18C is a schematic diagram of segment coils according to another embodiment illustrating segment coils in connection.

DETAILED DESCRIPTION OF THE PREFERRED EMBODIMENT

In the following, embodiments of the present invention will be described with reference to the drawings.
(Overall Structure of a Dynamo-Electric Machine)
In the following, embodiments of the present invention the will be described with reference to the drawings.

The dynamo-electric machine according to the embodiment is a dynamo-electric machine preferable for use in driving an automobile. So-called electric vehicles use a dynamo-electric machine. Here, there are two types of electric vehicles using a dynamo-electric machine. One is a hybrid electric vehicle (HEV) having both of an engine and a dynamo-electric machine, and the other is a pure electric vehicle (EV) driven by only a dynamo-electric machine, instead of using an engine. A dynamo-electric machine described below can be used for these two types of vehicles. Thus, a dynamo-electric machine for use in a representative hybrid automobile will be described.

In the following description, the term "axial direction" means a direction along the rotation axis of the dynamo-electric machine. The term "circumferential direction" means a direction along the rotation direction of the dynamo-electric machine. The term "radial direction" means the radial direction when the rotation axis of the dynamo-electric machine is centered. The term "inner side" means the inner side in the radial direction. The term "outer side" means the outer side in the radial direction, which is the opposite direction.

Figure 1:
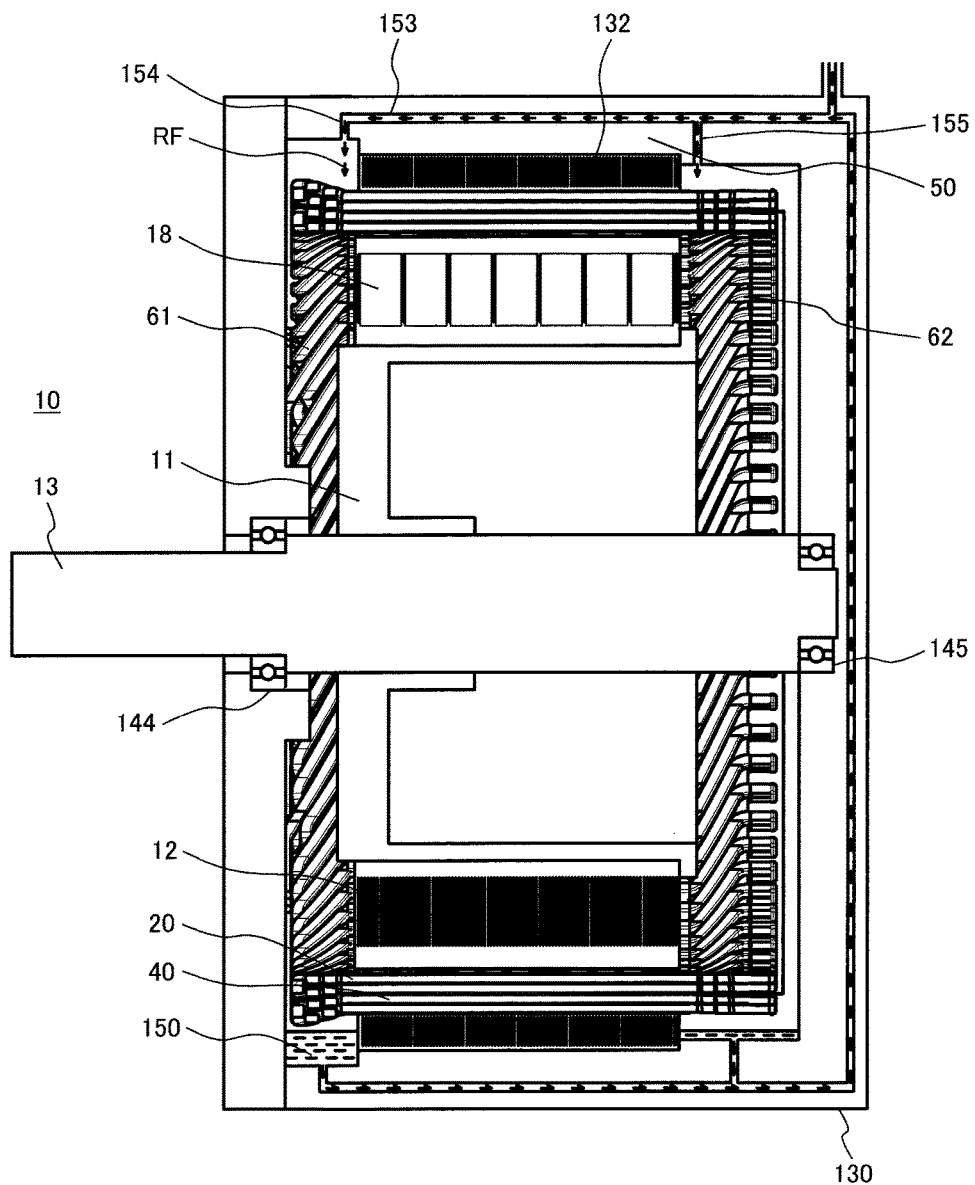
FIG. 1 is a cross sectional view of a dynamo-electric machine including a stator according to an embodiment taken along the rotation axis.
Figure 2:
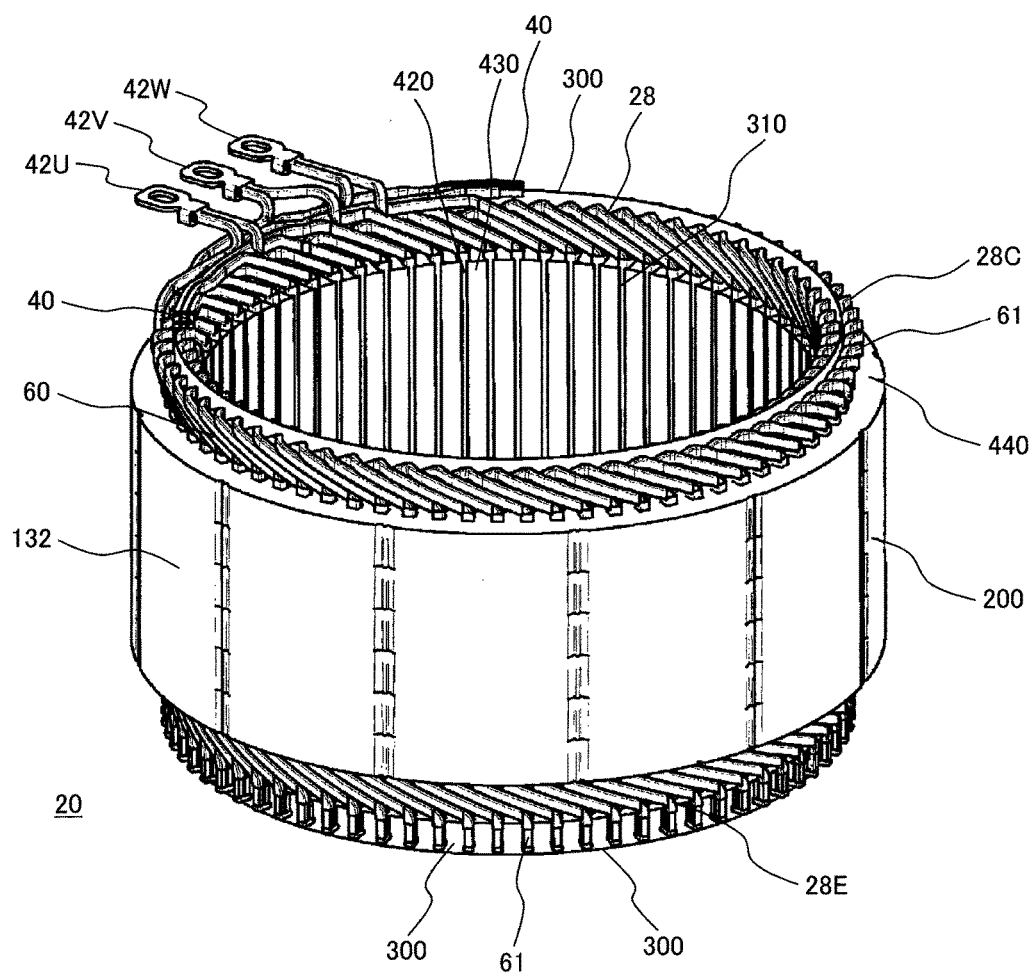
FIG. 2 is a perspective view of the stator of the dynamo-electric machine according to the embodiment.

FIG. 1 is a cross sectional view of the dynamo-electric machine according to the embodiment including a stator, which is taken along the rotation axis. FIG. 2 is a perspective view of the stator of the dynamo-electric machine according to the embodiment.

A dynamo-electric machine 10 is configured of a housing 50, a stator 20, a stator iron core 132, a stator coil 60 (see FIG. 2), and a rotator 11. The stator 20 is fixed on the inner side of the housing 50. The rotator 11 is rotatably supported on the inner side of the stator 20.

The housing 50 is a housing of the dynamo-electric machine 10, which is cylindrically formed by cutting an iron material, such as carbon steel, or by casting cast steel or an aluminum alloy, or by press working. The housing 50 is also referred to as a frame body or a frame. In the embodiment, the housing 50 is formed in a cylindrical shape by drawing a steel sheet (e.g. high tensile strength steel sheet) in a thickness of about 2 to 5 mm. The housing 50 is provided with a plurality of flanges, which are installed on the liquid cooling jacket 130.

The plurality of flanges project outwardly on the edge of one end face of the cylindrical housing 50 in the radial direction. The flanges are formed by cutting portions other than the flanges on the end portion formed in drawing. The flanges are formed integrally with the housing 50. The stator 20 may be directly fixed to a case without providing the housing 50.

The liquid cooling jacket 130 is fixed on the outer side of the housing 50. The inner wall of the liquid cooling jacket 130 and the outer wall of the housing 50 configure a coolant passage 153 of a liquid coolant RF such has oil. The liquid cooling jacket 130 accommodates bearings 144 and 145, and is also referred to as a bearing bracket.

In the case of direct liquid cooling in which the housing 50 directly contacts a liquid, the coolant RF stored in a coolant storage space 150 passes through the coolant passage 153, and flows from a coolant passage 154 or a coolant passage 155 to the stator 20 for cooling the stator 20.

The stator 20 is configured of the stator iron core 132 and the stator coil 60. The stator iron core 132 is formed of a stack of thin silicon steel sheets. The stator coil 60 is wound on a large number of slots 420 provided on the inner side of the stator iron core 132 (see FIGS. 2 and 3). Heat generated from the stator coil 60 is transferred to the liquid cooling jacket 130 through the stator iron core 132, and dissipated by the coolant RF flowing inside the liquid cooling jacket 130.

The rotator 11 is configured of a rotator iron core 12 and a shaft 13. The rotator iron core 12 is formed of a stack of thin silicon steel sheets. The shaft 13 is fixed to the center of the rotator iron core 12. The shaft 13 is rotatably held on the bearings 144 and 145 installed on the liquid cooling jacket 130. The shaft 13 is rotated at a predetermined location inside the stator 20, at a location at which the shaft 13 is opposed to the stator 20. The rotator 11 is provided with permanent magnets 18.

As illustrated in FIG. 1, the dynamo-electric machine 10 is disposed inside the liquid cooling jacket 130. The dynamo-electric machine 10 includes the housing 50, the stator 20 having the stator iron core 132 fixed to the housing 50, and the rotator 11 rotatably disposed inside the stator 20. The liquid cooling jacket 130 is configured of an engine case or a transmission case.

The dynamo-electric machine 10 is a permanent magnet built-in three-phase synchronous generator. The dynamo-electric machine 10 operates as a motor to rotate the rotator 11 with the supply of a three-phase alternating current to the stator coil 60 wound on the stator iron core 132. With the drive of the engine, the dynamo-electric machine 10 operates as a power generator to output three-phase alternating current power. In other words, the dynamo-electric machine 10 functions as both of a motor to generate running torque with electric energy and a power generator to generate electric power with mechanical energy. Thus, the dynamo-electric machine 10 can selectively use these functions.

(Configuration of the Stator)

The stator 20 has the cylindrical stator iron core 132 and the stator coil 60 mounted on the stator iron core 132.

(Configuration of the Stator Iron Core)

Figure 3:
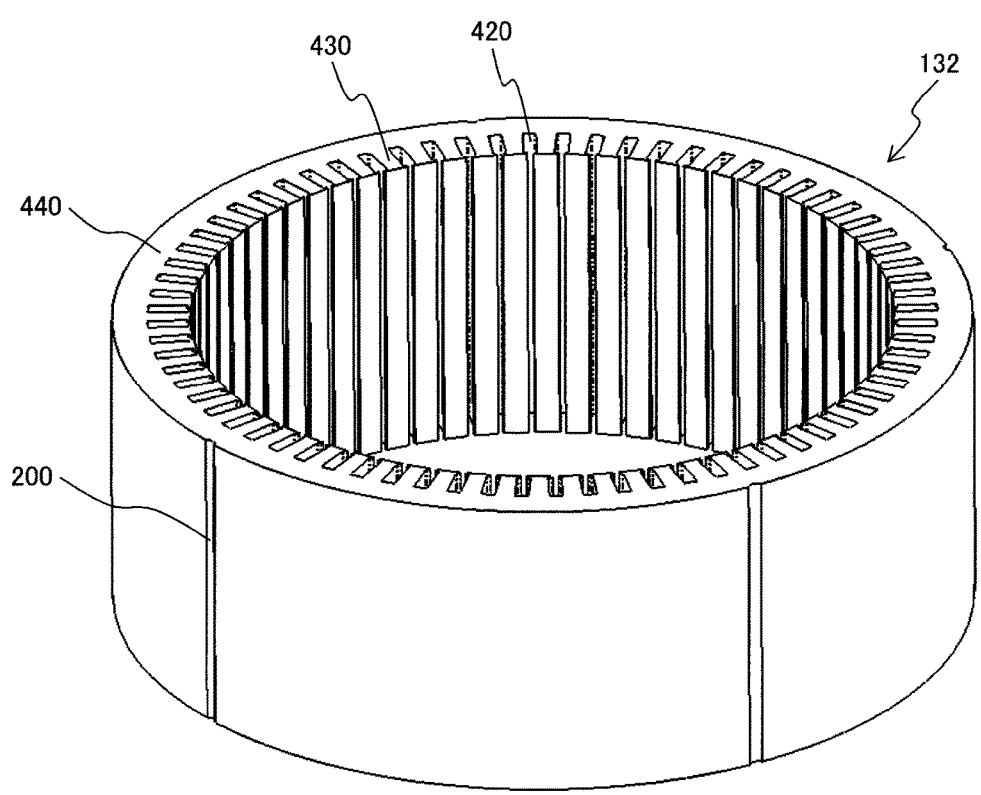
FIG. 3 is a perspective view of a stator iron core.
Figure 4:
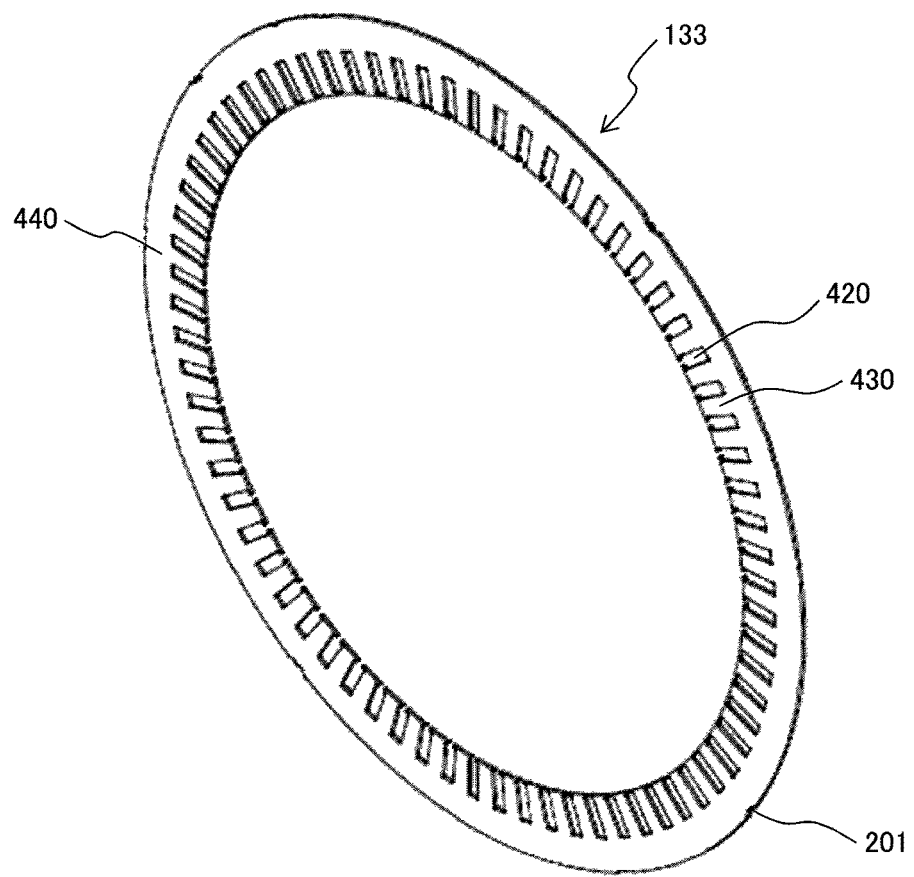
FIG. 4 is a perspective view of a flat-rolled magnetic steel sheet configuring the stator iron core.

Referring to FIGS. 3 and 4, the stator iron core 132 will be described. FIG. 3 is a perspective view of the stator iron core 132. FIG. 4 is a perspective view of a flat-rolled magnetic steel sheet 133 configuring the stator iron core 132.

As illustrated in FIG. 3, the stator iron core 132 is formed with the multiple slots 420 in parallel in the axial direction of the stator iron core 132. The multiple slots 420 are regularly spaced in the circumferential direction. In the embodiment, for example, the number of the slots 420 is 72. The slots 420 accommodate the stator coil 60 described with reference to FIG. 1. An opening is provided inside each of the slots 420. The width of this opening in the circumferential direction is almost equal to the width of the coil mounting portion of each of the slots 420 on which the stator coil 60 is mounted, or slightly smaller than the width of the coil mounting portion.

A tooth 430 is formed between the slots 420. The teeth 430 are integrally formed with an annular core pack 440. In other words, the stator iron core 132 is an integrated core in which the teeth 430 and the core pack 440 are integrally formed. The teeth 430 function to guide a rotating magnetic field generated by the stator coil 60 to the rotator 11 and to allow the rotator 11 to generate running torque.

The stator iron core 132 is a stack of a plurality of annular flat-rolled magnetic steel sheets 133. The flat-rolled magnetic steel sheet 133 (see FIG. 4) having a thickness of about 0.05 to 1.0 mm is formed by punching and then the multiple flat-rolled magnetic steel sheets 133, which are annularly formed, are stacked. On the outer circumferential side of the cylindrical stator iron core 132, welding portions 200 illustrated in FIG. 3 are provided in parallel with one another in the axial direction of the stator iron core 132 by tungsten inert gas (TIG) welding or laser welding, for example. As illustrated in FIG. 4, the welding portion 200 is formed in a semicircle welding groove 201. The welding portion 200 is provided in advance on the outer circumferential side of the flat-rolled magnetic steel sheet 133. Instead of providing the welding portions 200, the stator iron core 132 may be directly inserted into a case by caulking, for example, and then fixed to the case.

Figure 5:
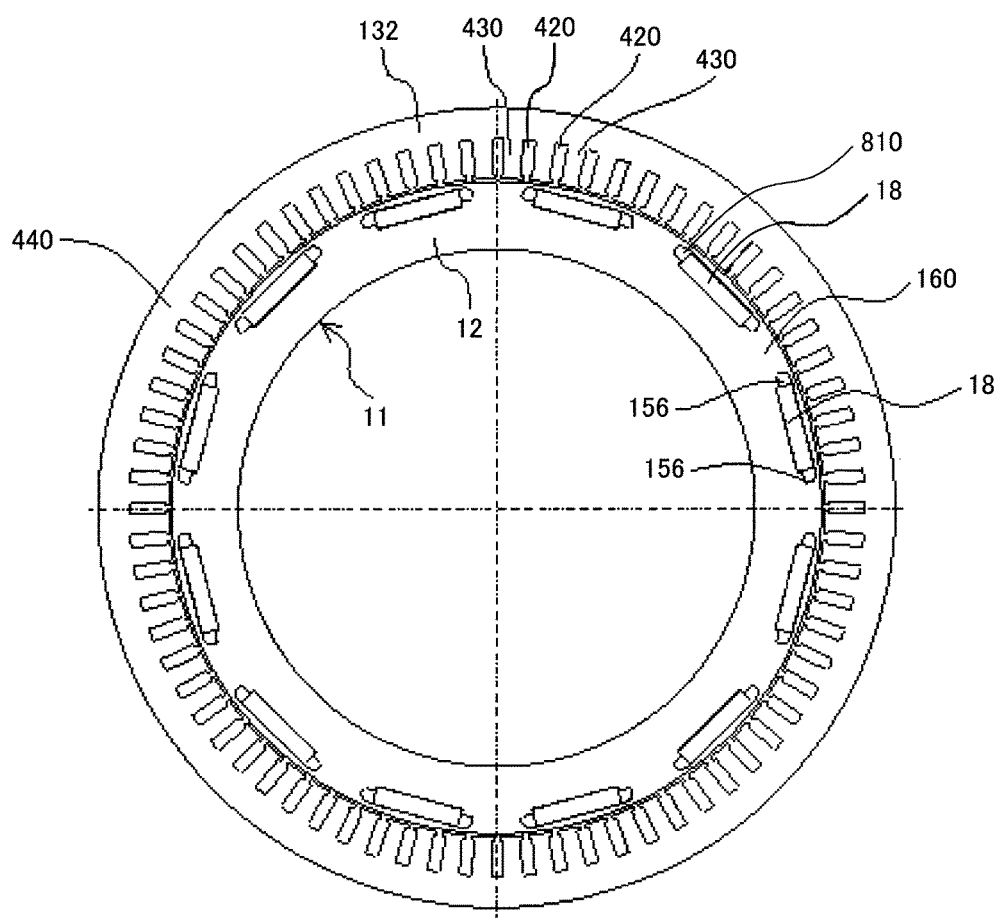
FIG. 5 is a cross sectional view of the stator and a rotator.

FIG. 5 is a cross sectional view of the stator 20 and the rotator 11. The rotator iron core 12 is formed with magnet insertion holes 810 regularly spaced. A rectangular magnet is inserted into each magnet insertion hole 810. The permanent magnet 18 is embedded in each of the magnet insertion holes 810. The permanent magnet 18 is fixed with an adhesive, powder resin, mold, or the like.

The width of the magnet insertion hole 810 in the circumferential direction is set greater than the width of the permanent magnet 18 in the circumferential direction. On both sides of the permanent magnet 18, a magnetic gap 156 is formed. An adhesive may be embedded in the magnetic gap 156. The magnetic gap 156 may be integrally fixed with the permanent magnet 18 using a molding resin.

The permanent magnet 18 functions to form the field pole of the rotator 11. In the embodiment, one permanent magnet 18 forms one magnetic pole. However, a plurality of magnets may form each magnetic poles. An increase in the number of the permanent magnets 18 causes an increase in the magnetic flux density of the magnetic poles, allowing an increase in magnet torque.

The magnetization direction of the permanent magnet 18 is directed in the radial direction. The orientation of the magnetization direction is inverted at every field pole. In other words, supposing that in a certain permanent magnet 18 forming a magnetic pole, the surface facing the stator is magnetized to the north pole and the surface facing the rotator is magnetized to the south pole. In this case, the surface of the adjacent permanent magnet 18, which forms a next magnetic pole, facing the stator is magnetized to the south pole, and the surface facing the rotator is magnetized to the north pole. These permanent magnets 18 are magnetized and disposed so that the magnetization direction is alternately changed for every magnetic pole in the circumferential direction.

In the embodiment, 12 permanent magnets 18 are regularly spaced. The rotator 11 forms 12 magnetic poles. Here, for the permanent magnet 18, a neodymium or samarium sintered magnet, ferrite magnet, and neodymium bonded magnet, for example, can be used.

In the embodiment, between the permanent magnets 18 for forming magnetic poles, an auxiliary magnetic pole 160 is formed. The auxiliary magnetic pole 160 functions to reduce the magnetic reluctance of the q-axis magnetic flux generated by the stator coil 60. The auxiliary magnetic pole 160 considerably reduces the magnetic reluctance of the q-axis magnetic flux less than the magnetic reluctance of the d-axis magnetic flux, which generates a large reluctance torque.

Figure 6:
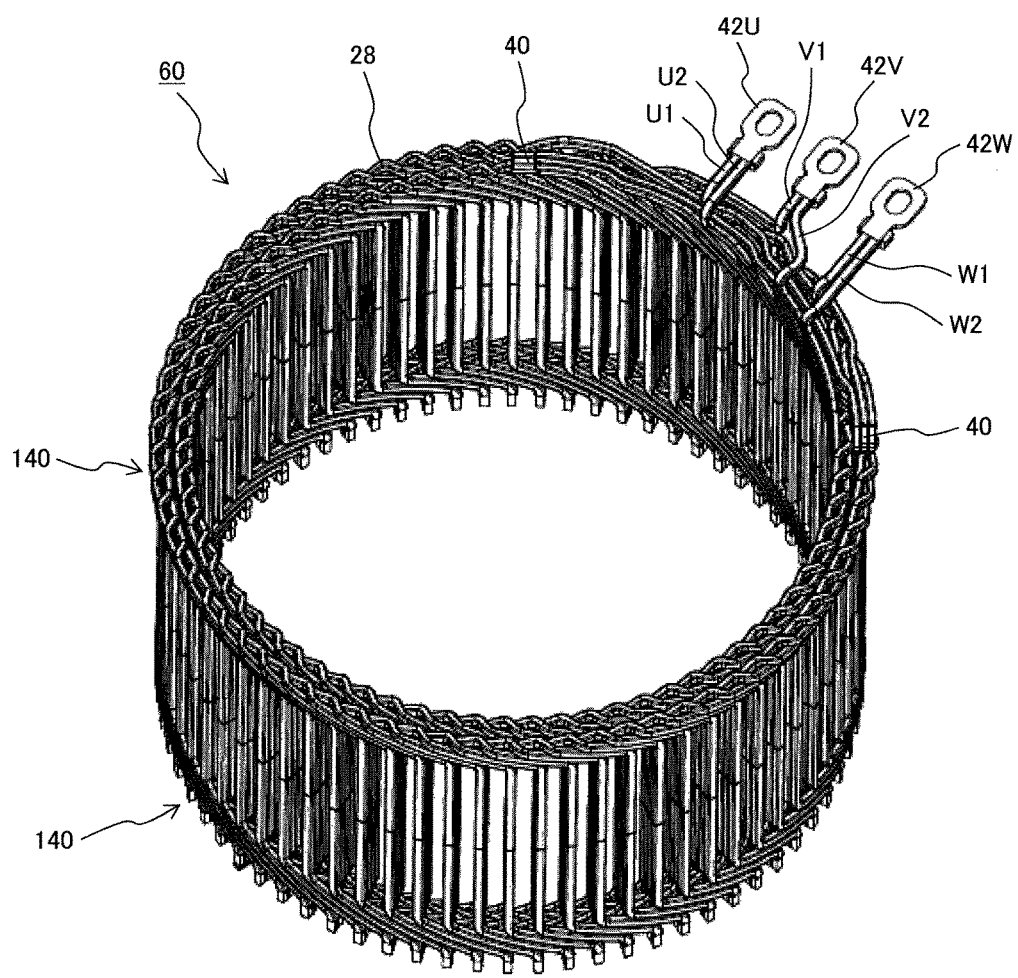
FIG. 6 is a perspective view of a stator coil including three phase coils.
Figure 7:
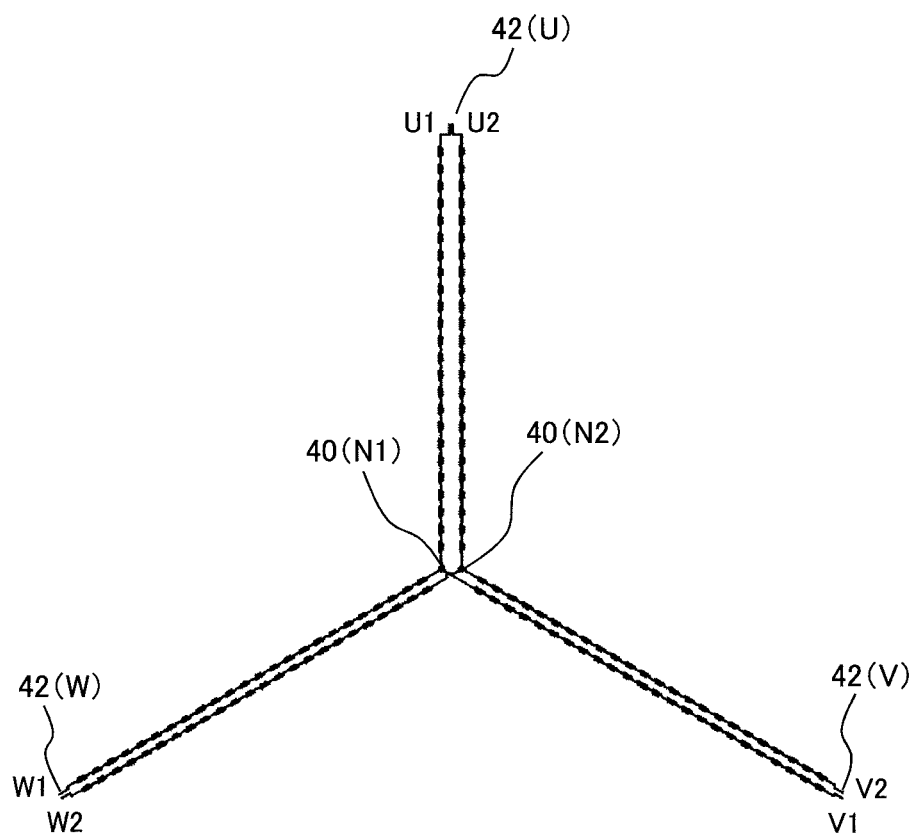
FIG. 7 is a diagram of a star connection.
Figure 9:
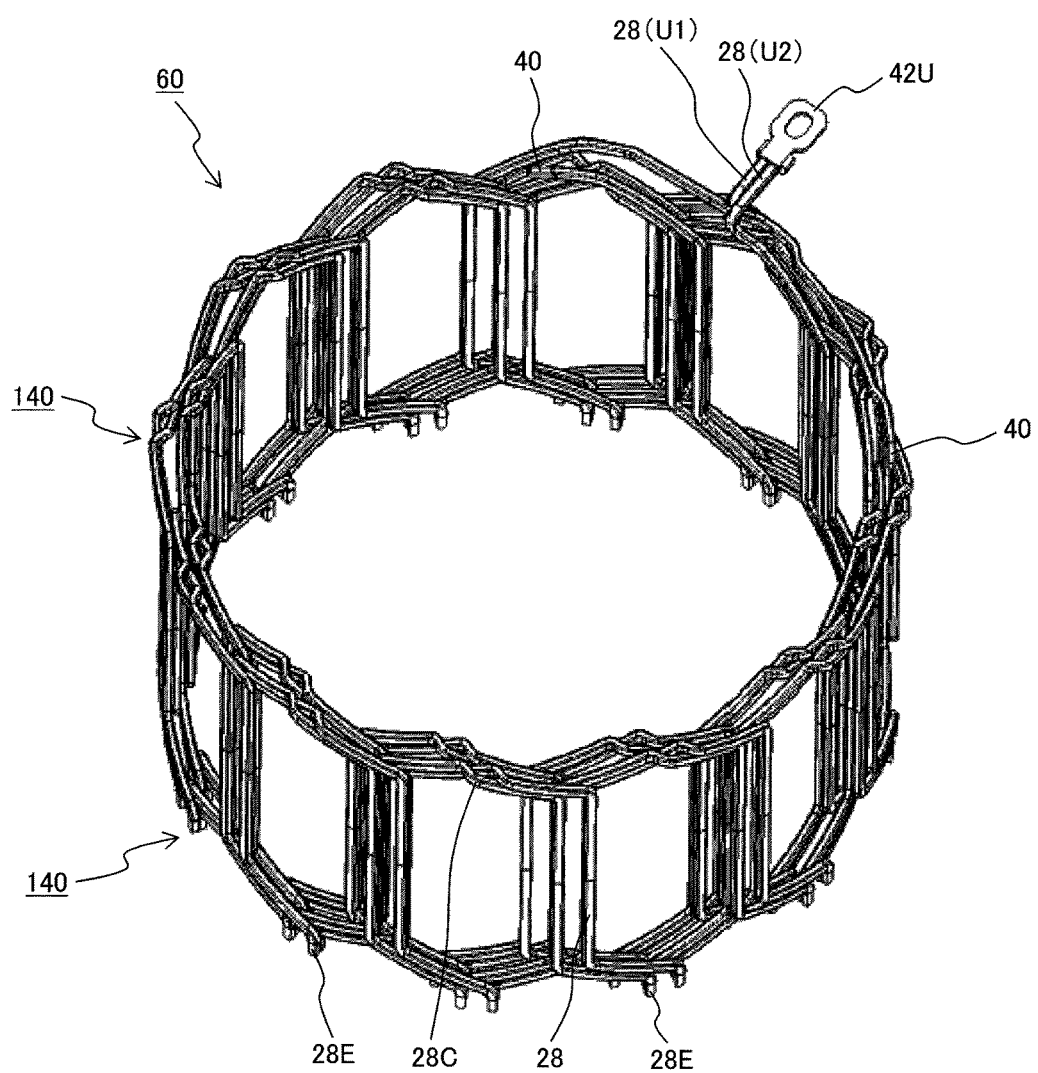
FIG. 9 is a perspective view of a U-phase stator including a first coil and a second coil.
Figure 10:
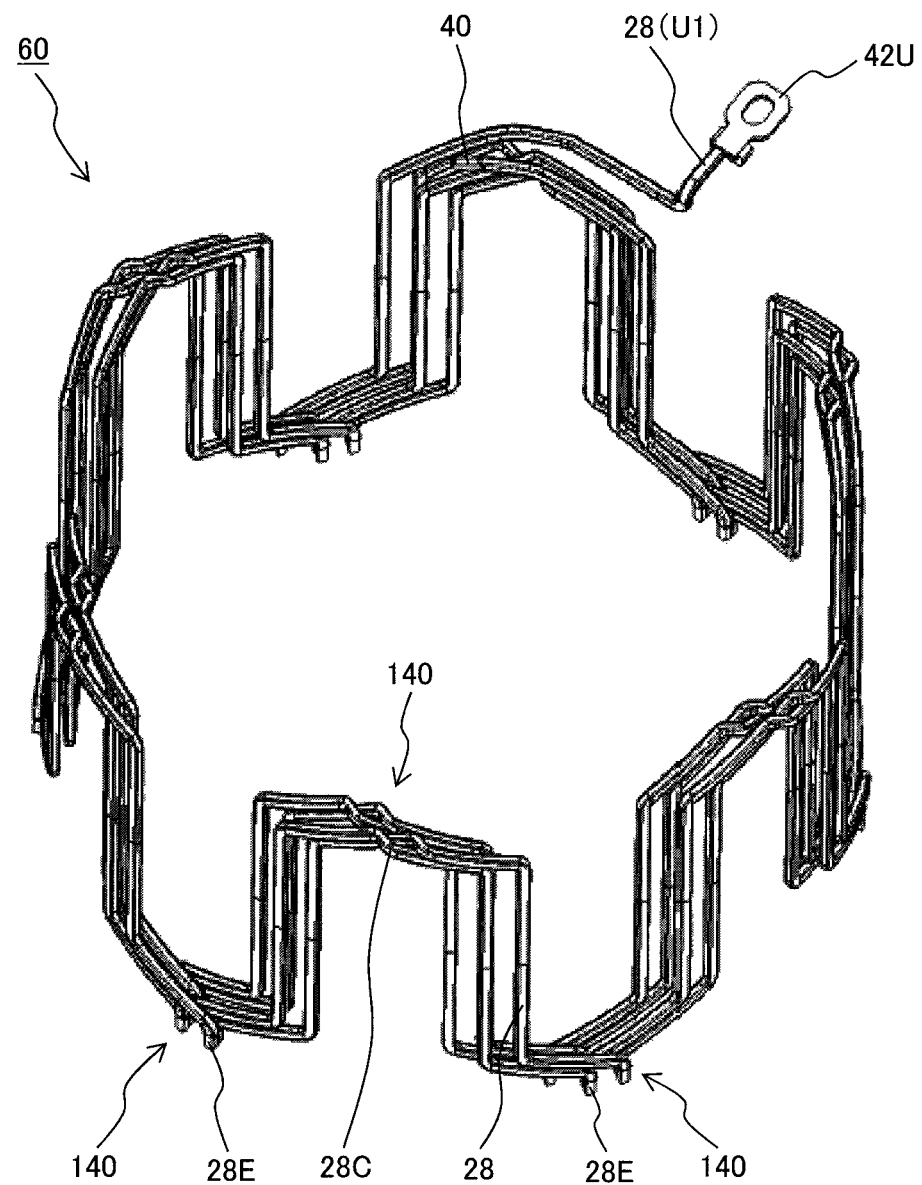
FIG. 10 is a perspective view of the first coil.
Figure 11:
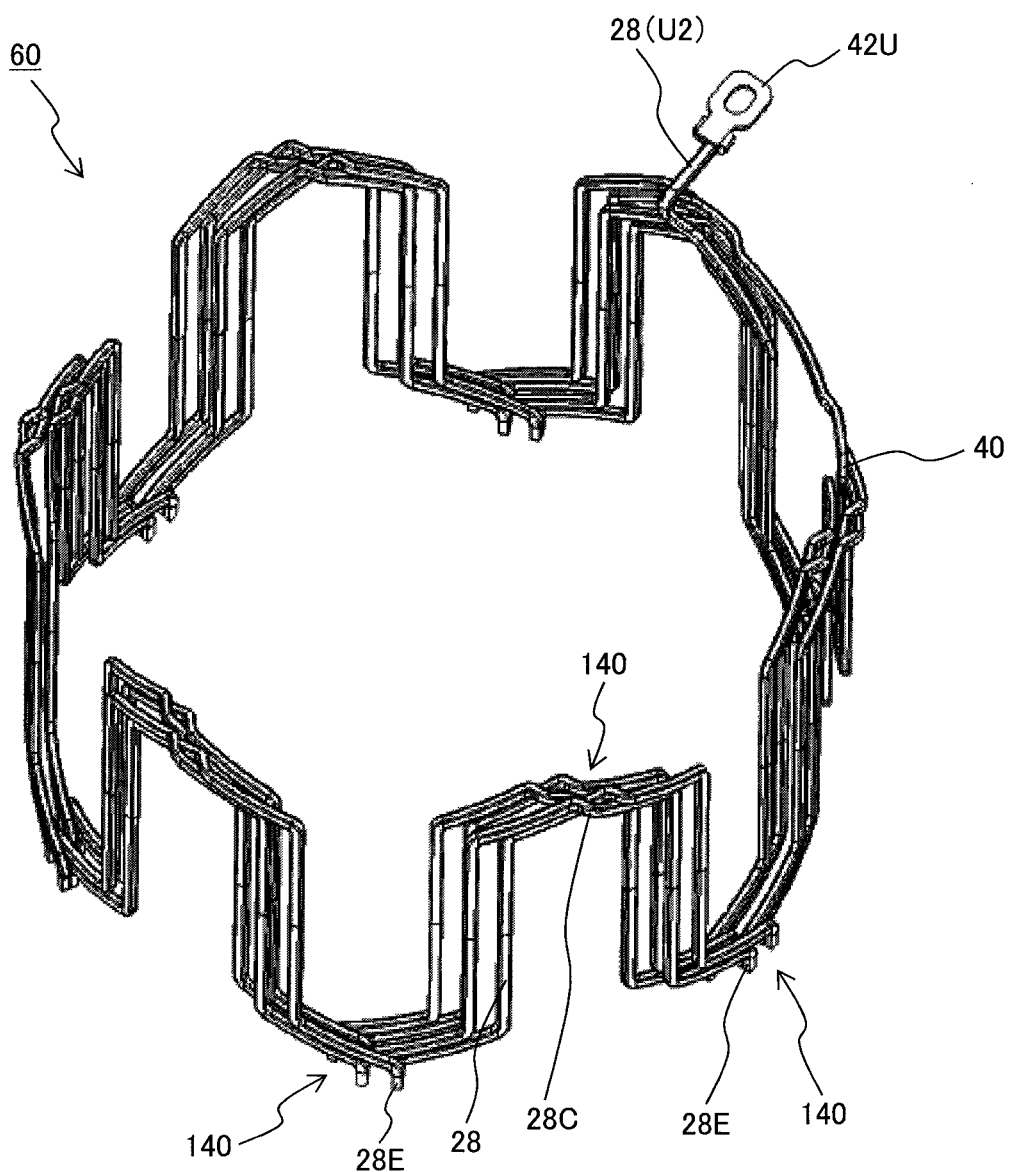
FIG. 11 is a perspective view of the second coil.

Referring to FIG. 2 and FIGS. 6 to 8, the stator coil 60 will be described. FIG. 6 is a perspective view of the stator coil 60 including three phase coils. FIG. 7 is a diagram of a star connection. FIGS. 8A to 8C are diagrams of the segment coils 28 of the stator coil 60. FIG. 8A is a diagram of one segment coil 28. FIG. 8B is a diagram of the segment coils 28 forming a coil. FIG. 8C is a diagram of the segment coils 28 disposed in the slot. FIG. 9 is a perspective view of a U-phase coil including a U1-phase coil and a U2-phase coil of the stator coil 60 wound on the stator iron core 132. FIG. 10 is a perspective view of the U1-phase coil of the stator coil 60. FIG. 11 is a perspective view of the U2-phase coil of the stator coil 60.

The stator coil 60 is in a star connection as illustrated in FIG. 7. In the embodiment, the stator coil 60 in a two-star configuration is adopted in which two star connections are connected in parallel with each other. In other words, a star connection of coils of a U1 phase, a V1 phase, and a W1 phase and a star connection of coils of a U2 phase, a V2 phase, and a W2 phase are provided. The lead wires of the U1 and U2 phase coils are gathered in one at an alternating current terminal 42U. The lead wires of the V1 and V2 phase coils are gathered in one at an alternating current terminal 42V. The lead wires of the W1 and W2 phases are gathered in one at an alternating current terminal 42W. Neutral point connecting conductors 40 (N1) and 40 (N2) form the neutral points of the star connections.

The stator coil 60 is wound by distributed winding, and connected in the star connection configuration. Distributed winding means a winding wire method in which phase winding wires are wound on the stator iron core 132 across the plurality of slots 420 so that a phase winding wire is accommodated in two separate slots 420.

In the embodiment, distributed winding is adopted as a winding wire method. Thus, the distribution of a formed magnetic flux is close to sine waves, compared with concentrated winding, easily generating reluctance torque. Therefore, the dynamo-electric machine 10 improves controllability using field weakening control or control with reluctance torque. The dynamo-electric machine 10 can be used in a wide rotation speed range from low to high rotation speed, and can provide excellent motor characteristics suited to electric vehicles.

The stator coil 60 includes three-phase coils in star connection. The coil wire of the stator coil 60 can have any cross sections including a circle and a rectangle. A structure, in which the cross sections inside the slots 420 are used as effectively as possible with a smaller space in the slot, easily provides the improvement of efficiency. Thus, the coil wire desirably has a rectangular cross section from the point of improving efficiency. The coil wire of the stator coil 60 can have any rectangular cross sections. For example, the edge is short in the circumferential direction of the stator iron core 132, and the edge is long in the radial direction. Alternatively, the edge is long in the circumferential direction of the stator iron core 132, and the edge is short in the radial direction.

In the embodiment, the stator coil 60 uses a flat wire in a rectangular cross section in which the edge of the rectangular coil wire of the stator coil 60 in each of the slots 420 is long in the circumferential direction of the stator iron core 132 and the edge is short in the radial direction of the stator iron core 132. The outer circumferential surface of this flat wire is covered with an insulating film. The flat wire of the stator coil 60 uses oxygen-free copper or oxygen-containing copper. For example, in the case of oxygen-containing copper, the oxygen percentage content is about 10 ppm or more and about 1,000 ppm.

Figure 8A:
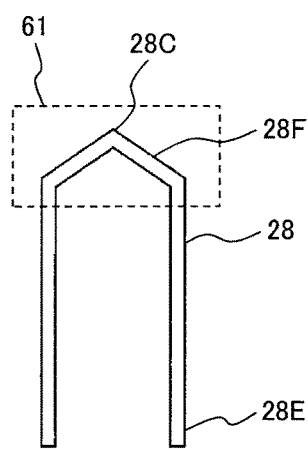
FIG. 8A is a diagram of a segment coil.

As illustrated in FIG. 8A, the flat wire is shaped in the segment coil 28 in a nearly U-shape so that a vertex 28C of a non-welding coil end 61 is a turn. In the shaping, the vertex 28C only has to be in a shape in which the orientation of the conductor is turned in a nearly U-shape. In other words, any shapes are possible including a nearly triangle as in FIG. 8A formed by the vertex 28C of the non-welding coil end 61 and conductor oblique portions 28F of the non-welding coil end 61 when viewed in the radial direction. For example, the shape may be a shape in which the conductor is nearly in parallel with the end face of the stator iron core 132 on a part of the vertex 28C of the non-welding coil end 61. In other words, the shape may be in a nearly trapezoid formed by the vertex 28C of the non-welding coil end 61 and the conductor oblique portions 28F of the non-welding coil end 61 when viewed in the radial direction.

Figure 8B:
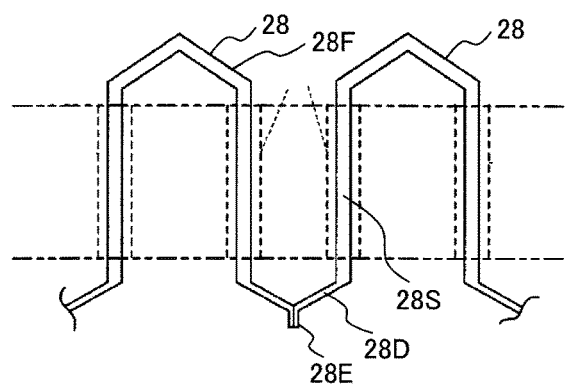
FIG. 8B is a diagram for explaining the formation of a coil with segment coils.

The multiple segment coils 28 are inserted from the axial direction of the dynamo-electric machine 10 into the stator slots 420 (see FIGS. 2 and 3). As illustrated in FIG. 8B, a first segment coil 28 and a second segment coil 28 are inserted into the stator slots 420 with a predetermined number of the stator slots 420 being spaced. The first and second segment coils 28 are connected to each other at conductor end portions 28E of the first and second segment coils 28. A connecting method is mainly welding. However, a solder material may be used.

In the connection, the segment coil 28 is formed with a conductor straight portion 28S to be accommodated in the stator slot 420 and a conductor oblique portion 28D tilted toward the conductor end portion 28E of the segment coil 28 to be connected. The conductor oblique portion 28D and the conductor end portion 28E are formed by bending the coil wire of the segment coil 28.

Figure 8C:
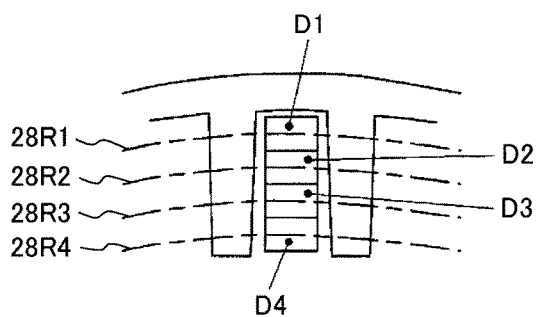
FIG. 8C is a diagram for explaining the disposition of segment coils in a slot.

Into the stator slot 420, two, four, six, (a multiple of two) segment coils 28 are inserted. As illustrated in FIG. 8C, this is an example in which four segment coils 28R1 to 28R4 are inserted into one stator slot 420. The segment coils 28R1 to 28R4 are conductors having cross sections D1 to D4, respectively, in a nearly rectangle. Thus, the space factor of the inside the slot 420 can be improved, which improves the efficiency of the dynamo-electric machine 10.

FIG. 9 is a perspective view of one phase coil (e.g. the U phase coil) of the stator coil 60 in which as in FIG. 8B, the segment coils 28 are repeatedly connected to finally form a ring.

The stator coil 60 for one phase is formed so that the conductor end portions 28E are gathered on one side in the axial direction. Thus, as illustrated in FIG. 1, a welding coil end 62, at which the conductor end portions 28E are gathered, and the non-welding coil end 61 are formed.

One phase coil of the stator coil 60 is formed with the alternating current terminal (in examples in FIGS. 9 to 11, the alternating current terminal 42U of the U phase coil) on one end, and the neutral point connecting conductor 40 on the other end. As illustrated in FIG. 6, the stator coil 60 is configured of coil wires in six lines (U1, U2, V1, V2, W1, and W2). As illustrated in FIG. 2, the stator coil 60 is mounted on the stator iron core 132. The coil wires in six lines are arranged at appropriate spacings with the slots 420.

The stator coil 60 has a first coil end 140 and a second coil end 140. On the first coil end 140 of the stator coil 60, the alternating current terminals 42U, 42V, and 42W, which are input/output coil conductors of the U-, the V-, and the W-phase coils, respectively, of the stator coil 60 and the neutral point connecting conductor 40 are lead out.

In order to improve workability in the assembly of the dynamo-electric machine 10, the alternating current terminals 42U, 42V, and 42W are disposed so as to project outwardly from the first coil end 140 in the axial direction of the stator iron core 132. The stator 20 is connected to a power converter, not shown, through the alternating current terminals 42U, 42V, and 42W, and then supplied with alternating-current power.

As illustrated in FIGS. 2 and 6, in the stator coil 60, connecting wires are neatly disposed as a whole on the first and second coil ends 140, which project outwardly from the stator iron core 132 in the axial direction. This provides the effect leading to downsizing the entire dynamo-electric machine 10. The first and second coil ends 140, which are neatly disposed, are desirable also from the viewpoint of improving the reliability of insulating properties.

The stator coil 60 has a structure in which the outer circumferential surface of the segment coil 28 is covered with an insulating film. The electrical insulating properties are maintained. In addition to this insulating film, the dielectric voltage is maintained with an insulating paper sheet 300 illustrated in FIG. 2. Consequently, reliability can be further improved.

As illustrated in FIG. 2, the insulating paper sheet 300 is disposed on the slots 420 and the first and second coil ends 140. The insulating paper sheet disposed on the slots 420, which is a so-called slot liner 310, is disposed between the segment coils 28 inserted into the slot 420 and between the segment coil 28 and the inner surface of the slot 420. This slot liner 310 improves the dielectric voltage between the segment coils 28 and between the segment coil 28 and the inner surface of the slot 420.

The insulating paper sheet 300, which is disposed on the first and second coil ends 140, is used as annularly disposed between the segment coils 28 for insulating the phase coils from each other and for insulating conductors from each other on the first and second coil ends 140. The insulating paper sheet 300 is a holding member for preventing a resin member (e.g. polyester or epoxy liquid varnish) from drooling when the resin member is dropped onto the whole or a part of the stator coil 60.

As described above, in the dynamo-electric machine 10 according to the embodiment, the insulating paper sheet 300 is disposed on the inner side of the slot 420 and on the first and second coil ends 140. Thus, a necessary dielectric voltage can be maintained even though the insulating film is damaged or degraded. For example, the insulating paper sheet 300 is an insulating sheet made of heat resistant polyamide paper in a thickness of about 0.1 to 0.5 mm.

A manufacturing method for the dynamo-electric machine 10 according to the embodiment of the present invention will be described. FIGS. 12A to 15B and FIG. 16 are diagrams of the process steps of manufacturing the stator 20 of the dynamo-electric machine 10 according to the embodiment of the present invention. These diagrams illustrate a positioning process, a trapezoid forming process, and a welding process of the segment coil 28.

Figure 12A:
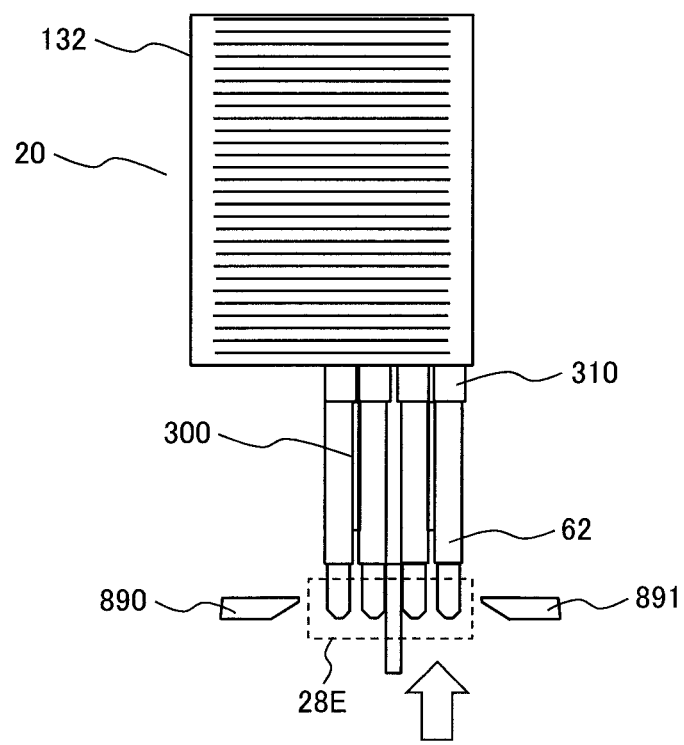
FIG. 12A is a diagram of segment coils before they are contacted with cutting tools.
Figure 12B:
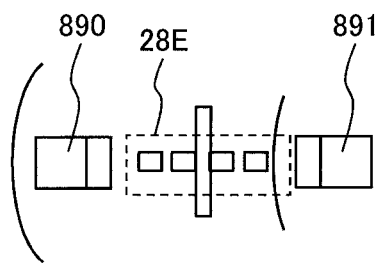
FIG. 12B is a diagram of the segment coils before they are contacted with cutting tools.

FIG. 12A is a partially enlarged diagram of a side view of the stator 20 when viewed in the same direction in FIG. 1. FIG. 12B is a diagram when viewed in the direction of arrow A in FIG. 12A. FIG. 12A and FIG. 12B are diagrams before the segment coils 28 are contacted with the cutting tools 890 and 891. After the multiple segment coils 28 are shaped, in order to lower the height of the shaped segment coils 28 or the height of the first and second coil ends 140, the conductor end portions 28E are cut with cutting tools 890 and 891. After that, the multiple segment coils 28 are welded to one another.

FIG. 13A is a diagram when viewed in the same direction in FIG. 12A. FIG. 13B is a diagram when viewed in the same direction in FIG. 12B. FIG. 13A and FIG. 13B are diagrams illustrating the segment coils 28, which are deformed by the cutting tools 890 and 891. As illustrated in FIG. 13B, an innermost segment coil 28G on the innermost radius side and an outermost segment coil 28H on the outermost radius side are pressed so that their cross sections are in trapezoid shapes 900. The cross sections of the segment coils 28G and 28H may be formed in the trapezoid shapes 900 before the segment coils 28G and 28H are inserted into the slot 420.

Figure 14A:
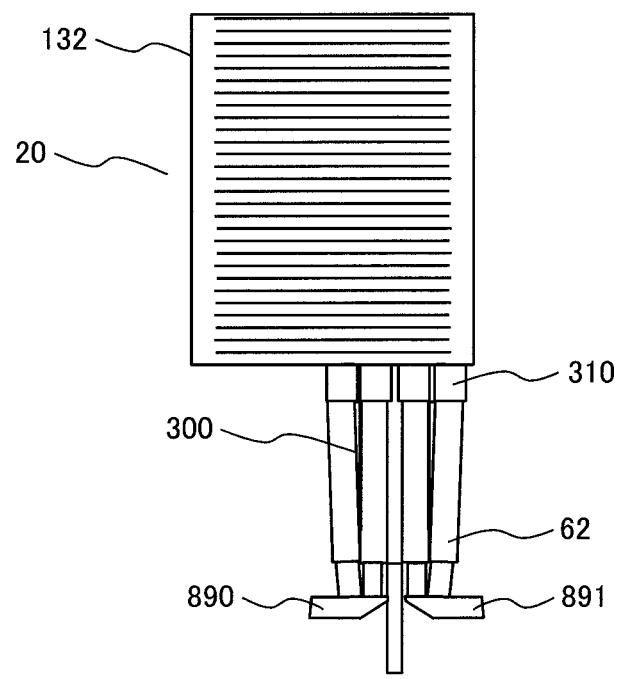
FIG. 14A is a diagram of segment coils immediately after partially cut by cutting tools.
Figure 14B:
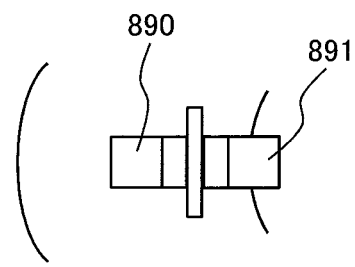
FIG. 14B is a diagram the segment coils immediately after partially cut by the cutting tools.

FIG. 14A is a diagram when viewed in the same direction in FIG. 12A. FIG. 14B is a diagram when viewed in the same direction in FIG. 12B. FIG. 14A and FIG. 14B are diagrams immediately after a part of each of the segment coils 28 is cut by the cutting tools 890 and 891.

Figure 15A:
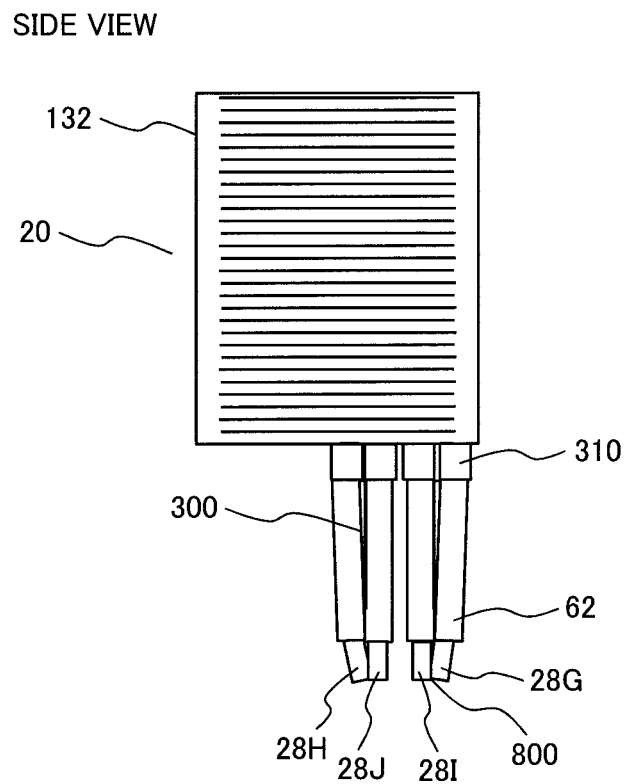
FIG. 15A is a diagram of segment coils after they are partially cut, with cutting tools being retracted.
Figure 15B:
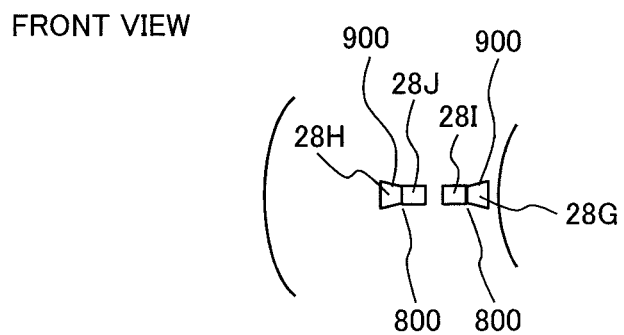
FIG. 15B is a diagram of the segment coils after they are partially cut, with the cutting tools being retracted.

FIG. 15A is a diagram when viewed in the same direction in FIG. 12A. FIG. 15B is a diagram when viewed in the same direction in FIG. 12B. FIG. 15A and FIG. 15B are diagrams after a part of each of the segment coils 28 is cut by the cutting tools 890 and 891 and the cutting tools 890 and 891 are retracted.

As illustrated in FIGS. 13A and 13B, the segment coil 28G is pressed so that the cross section of the segment coil 28G is in the trapezoid shape 900. Consequently, the segment coil 28G is brought to contact a segment coil 28I. Thus, the upper base of the trapezoid shape 900 of the segment coil 28G can be pressed against the segment coil 28I, allowing easy positioning in welding. Therefore, the adjustment of the components before welding is eliminated, which allows easy welding work in the back-end process of TIG welding, plasma welding, or laser welding. Thus, productivity is improved. This is also applied to the segment coil 28H. Accordingly, the joining area can be stably provided. The positional relationship between the segment coils is stable before welding. Thus, the length for removal can also be shortened.

FIG. 16 is a perspective view of the segment coils 28 formed in the trapezoid shape 900 in which the tip ends are welded by TIG welding. The tip end shape of the segment coil 28 is formed in a trapezoid shape, and thus the segment coils 28 can be molten, with the lower base of the trapezoid shape 900 remaining. The height of the coil end can be lowered with no spherical tip ends.

In the case where connecting portions 800 of the segment coils 28 are welded to each other, the welded connecting portions 800 are in a mountain shape, and a spread 830 is formed on the bottom face side of the mountain shape. As described above, in the embodiment, the trapezoid shape 900 to reduce surface tension is formed. Thus, the coil end can be made smaller. When a large joining area is provided, the connecting portions 800 are welded toward the lower side (in the gravity direction) in welding, for example. The connecting portions 800 are joined by arc welding such as TIG welding or plasma welding. The connecting portions 800 are joined by melting a molten copper wire base material. For a shield gas, argon, helium, or mixed gas of argon and helium is used, for example.

Figure 17C:
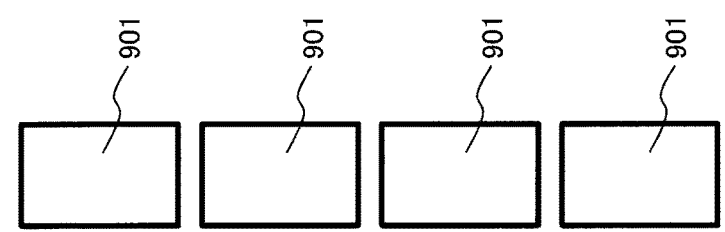
FIG. 17C is a schematic diagram of segment coils in connection.
Figure 17B:
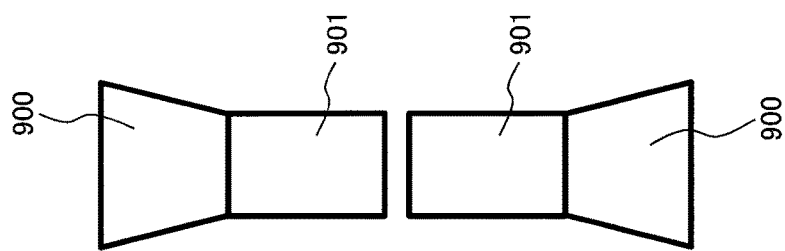
FIG. 17B is a schematic diagram of the shape of segment coils formed in a trapezoid cross section.
Figure 17A:
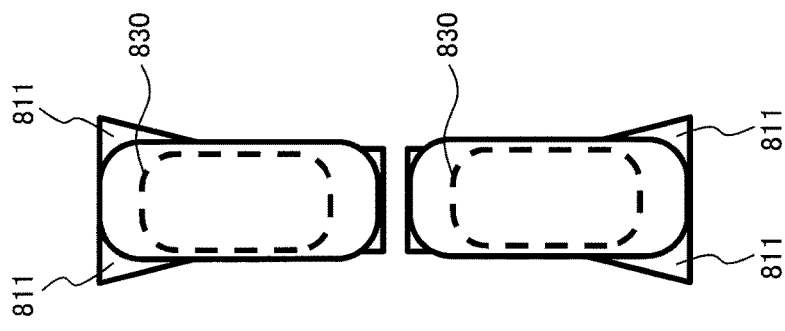
FIG. 17A is a schematic diagram of the shape of segment coils before they are formed in a trapezoid cross section.

FIGS. 17A to 17C are schematic diagrams of the shapes of the segment coils 28 before and after cut.

The rectangular cross section of the segment coil 28 is in a shape in which the edge of the cross section is short in the circumferential direction of the stator iron core 132 and the edge is long in the radial direction. FIG. 17A is a form of the rectangle 901 before the segment coil 28 is formed in a trapezoid. FIG. 17B is a form when the segment coil 28 is formed in the trapezoid shape 900. FIG. 17C is a form when the segment coils 28 are connected to each other. The tip end shape of the segment coil 28 is formed in the trapezoid shape 900, and the tip end is molten, with corners 811 on the lower base of the trapezoid shape 900 remaining. Thus, the height of the coil end can be lowered with no spherical tip ends.

FIGS. 18A to 18C are schematic diagrams of the segment coils 28 according to another embodiment, illustrating the shapes of the segment coils 28 before and after they are cut. The rectangular cross section of a stator coil wire is in a shape in which the edge of the rectangular cross section is long in the circumferential direction of the stator iron core 132, and the edge is short in the radial direction. FIG. 18A is a form of the rectangle 901 before the segment coil 28 is formed in a trapezoid. FIG. 18B is a form when the segment coil 28 is formed in the trapezoid shape 900. FIG. 18C is a form when the segment coils 28 are connected to each other. The tip end shape of the segment coil 28 is formed in the trapezoid shape 900, and the tip end is molten, with corners 811 on the lower base of the trapezoid shape 900 remaining. Thus, the height of the coil end can be lowered with no spherical tip ends.

The configurations in FIGS. 17A to 17C and FIGS. 18A to 18C can be applied to the case where the tip end of the segment coil 28 is formed in a trapezoid before the tip end is cut.

With the configurations, the positional relationship between the segment coils after formed is stable. Thus, a stable insulation distance can be provided. It is possible to obtain a dynamo-electric machine that satisfies insulating properties demanded for an electric vehicle and a hybrid electric vehicle.

In the description above, the permanent magnet dynamo-electric machine is described. A feature of an embodiment of the present invention relates to the coil end of the stator. Any rotators are applicable including a permanent magnet rotator, induction rotator, synchronous reluctance rotator, and claw magnetic pole rotator. The winding wire method is wave winding. Any winding wire methods having similar characteristics are applicable. In the embodiment, internal rotation magnet dynamo-electric machine is described. However, the embodiments are also similarly applicable to external rotation dynamo-electric machines.

Figure 19:
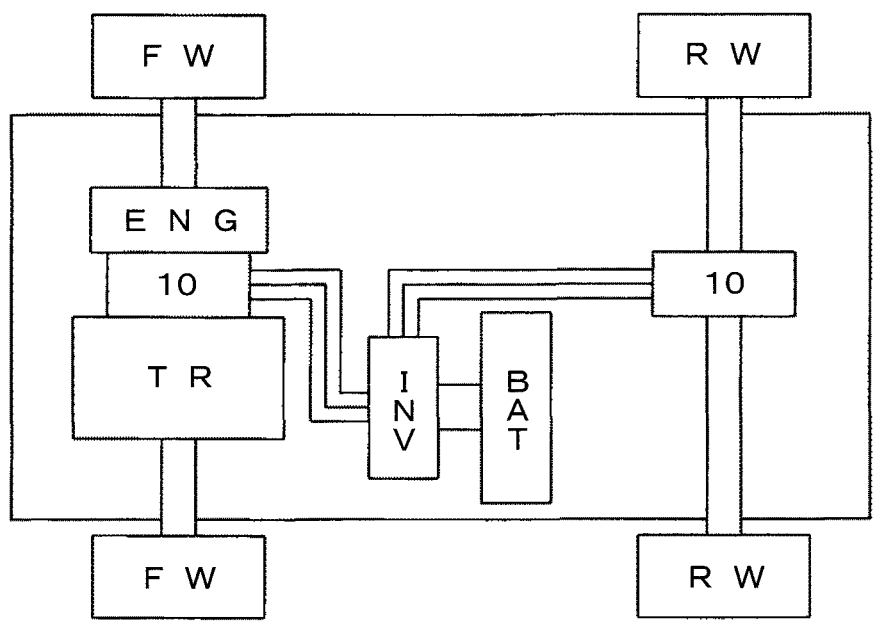
FIG. 19 is a block diagram of the configuration of a vehicle mounted with the dynamo-electric machine according to an embodiment of the present invention.

Referring to FIG. 19, the configuration of a vehicle mounted with the dynamo-electric machine 10 according to the embodiment will be described. FIG. 19 is a power train of a hybrid automobile in accordance with four-wheel drive. The vehicle includes an engine ENG and the dynamo-electric machine 10 for main power for the front wheels. Power generated by the engine ENG and the dynamo-electric machine 10 is shifted by a transmission TR, and the power is transmitted to front driving wheels FW. In driving rear wheels, the dynamo-electric machine 10 disposed for the rear wheels is mechanically joined to rear driving wheels RW, and power is transmitted.

The dynamo-electric machine 10 starts the engine. The dynamo-electric machine 10 switches between the generation of driving force and the generation of electric power to recover energy in reducing the speed of the vehicle as electric energy in accordance with the driving state of the vehicle. The driving and electric power generating operations of the dynamo-electric machine 10 are controlled by a power converter INV so that torque and the number of revolutions are optimum, matched with the situations of driving the vehicle. Electric power necessary for driving the dynamo-electric machine 10 is supplied from a battery BAT through the power converter INV. When the dynamo-electric machine 10 is in electric power generating operation, electric energy is charged to the battery BAT through the power converter INV.

Here, the dynamo-electric machine 10, which is the front wheel power source, is disposed between the engine ENG and the transmission TR, and has the configurations described in FIGS. 1 to 18. For the dynamo-electric machine 10, which is the rear wheel driving force source, a similar dynamo-electric machine can be used, or dynamo-electric machines in other typical configurations can also be used. The dynamo-electric machine 10 is of course applicable to hybrid systems other than four-wheel drive systems.

As described above, according to the embodiments of the present invention, it is possible to provide a stator of a small-sized, high-output dynamo-electric machine excellent in insulating properties.

The present invention is not limited to the foregoing embodiments. The present invention includes various modifications. For example, the foregoing embodiments are described in detail for easily understanding the present invention. The present invention is not necessarily limited to ones including all the described configurations. A part of the configuration of the embodiments can be additionally provided with, removed from, replaced by another configuration.

For an example of the application of the embodiment of the present invention, the dynamo-electric machine for electric vehicles and hybrid electric vehicles are described. The dynamo-electric machine according to the embodiments of the present invention is applicable to any motors having the same problems of course including auxiliary motors for automobiles such as an alternator, starter generator (including motor generators), electrically-driven compressor, ad electrically-driven pump, and also applicable to industrial motors for elevators and motors for household electrical appliances such as an air-conditioner compressor.

What is claimed is:

1. A dynamo-electric machine comprising:
    a stator having:
        a stator iron core formed with a plurality of slots arranged in a circumferential direction, and
        a stator coil inserted into the slots of the stator iron core, the stator coil being provided with an insulating film; and
    a rotator rotatably disposed on the stator iron core with a predetermined gap,
    wherein: in the stator coil, a plurality of segment coils are connected to one another, and each segment coil is a conductor having a rectangular cross section formed in advance in a nearly U-shape; and
    in the plurality of segment coils, at least one segment coil has a tip end and a cross section of the tip end has a first side with a first width and a second side with a second width, the first side being opposed to the second side, wherein the first width of the first side is less than the second width of the second side, and
    in the plurality of segment coils, at least one adjacent segment coil has a molten portion that is molten to form a connecting portion for the adjacent segment coil,
    wherein the first side of the tip end touches the adjacent segment coil,
    wherein a corner is formed on the second side of the tip end and is in non-contact with the molten portion, and
    wherein the corner and the tip end are formed on a same plane.

2. The dynamo-electric machine according to claim 1, wherein all sides of the cross section of the tip end are formed in a trapezoid shape.

* * * * *